(12) United States Patent
Wardlaw

(10) Patent No.: US 6,758,668 B1
(45) Date of Patent: Jul. 6, 2004

(54) PREHEATING DEVICE FOR HEAVY WALL PIPE

(76) Inventor: Louis J. Wardlaw, 5322 Addicks-Satsuma Rd., Houston, TX (US) 77284

( * ) Notice: Subject to any disclaimer, the term of this patent is extended or adjusted under 35 U.S.C. 154(b) by 0 days.

(21) Appl. No.: 10/461,976

(22) Filed: Jun. 11, 2003

(51) Int. Cl.$^7$ .................................................. F24J 3/00
(52) U.S. Cl. ......................... 432/225; 432/224; 166/58; 228/241
(58) Field of Search ............................... 432/224, 225, 432/10, 63, 226, 231; 228/241; 266/167; 126/271.2 R; 166/58, 59, 61

(56) References Cited

U.S. PATENT DOCUMENTS

| | | | |
|---|---|---|---|
| 4,507,082 A | * 3/1985 | Wardlaw, III | ............... 432/224 |
| 4,585,158 A | * 4/1986 | Wardlaw, III | ............... 228/232 |
| 5,205,732 A | * 4/1993 | Kirby | ......................... 432/238 |
| 5,947,111 A | * 9/1999 | Neulander et al. | ........ 126/351.1 |

* cited by examiner

Primary Examiner—Gregory Wilson
(74) Attorney, Agent, or Firm—William C. Norvell, Jr.; Beirne, Maynard & Parsons LLP

(57) ABSTRACT

A preheating apparatus is disclosed which supports a hollow, cylindrical combustible heating element. A solid fuel mixture is used to generate hot gases for the heating of metal surfaces for pre-welding purposes. A grooveway is imbedded radially around the upper portion of the solid fuel mixture. An oxygen liberating pre-starter compound is housed in the grooveway for uniformity of ignition of the combustible solid fuel to permit a more uniform and consistent burn of the solid fuel during hot gas generation.

13 Claims, 3 Drawing Sheets

PREHEATING DEVICE FOR HEAVY WALL PIPE

BACKGROUND OF THE INVENTION

In drilling an oil well, especially at an offshore location, it is necessary to install flanges of various sizes of large diameter pipe. Consider, as an example, the instance where several sizes of casing are installed in a well. The well might include, as an example, a 36 inch drive pipe. There may also be a 20 inch casing, 133/8ths inch casing and 95/8ths inch casing. It is necessary to install a termination flange or casing head at every change of size. The flange is typically installed by first cutting the casing, preheating the casing and then welding the flange in place. The flange is necessary to mount other equipment or to otherwise install the next casing string.

Often, this requires cutting a very thick wall casing, even in the range of 1½ inch thick and thereafter making a multi-pass welded bead to attach the flange. This requires a tremendous amount of preheating to obtain a quality weld.

For drilling rigs located at sea, the preheating is something of a problem. In inclement weather, wind shields must be installed and a number of welders will position their torches on the casing and flange to preheat it for perhaps 4 to 6 inches below the casing head in length to perhaps 500.degree. F. This is difficult and time consuming. Moreover, cooling begins on the instant that preheating is stopped. It is difficult to preheat the casing and simultaneously weld a flange to it.

Certain devices have been provided heretofore to serve as preheaters. While these devices have various and sundry advantages, it is believed that the device of this disclosure is much more attractive for the intended purpose, namely to provide a preheater which can be selectively installed within a casing, whereby preheating occurs from the interior. This enables the welder to install the flange or casing head and quickly begin the multi-pass bead required to fasten the flange in place.

The various preheater devices are typified by the patent of Jaeger, U.S. Pat. No. 3,082,760. However, this device and others like it are believed to be limited. There is a real risk that the preheater device will be lost down the casing. If this occurs, it may then be lost in the wellbore. In the wellbore, it poses a serious problem. It is necessary to remove it because it is very difficult to drill through the steel Jaeger device. In either case it is not very desirable.

In U.S. Pat. No. 4,507,082, there is disclosed a preheating insert for heavy wall pipe. This device has enjoyed considerable commercial success. The solid fuel mixture used in such a device, and as disclosed therein, is ignited either by placing a torch or similar mechanism in communication with a starter material which previously has been mixed within a top portion of the solid fuel mixture. Several holes may be bored through a deflector plate, or otherwise, for purposes of permitting the torch to contact the fuel portion with the igniter or starter material. It has been found that on occasion the resulting burn of the igniter or starter compound will not be consistent completely around the top of the solid fuel compound, resulting in an inconsistent burn of the solid fuel from one side to another side of the housing. The resulting effect is similar to a fire being started in a home barbecue by spraying a liquid fire starter on only one side of the grill and then igniting the starter. The result oftentimes is that an effective burn occurs only on one side or portion of the fuel. The present invention addresses this phenomenon of this prior art device.

The preheater device of this disclosure utilizes a cement receptacle which is non-corrosive to saltwater, relatively inexpensive, and able to be broken into small pieces should it fall into the wellbore. It is relatively easy to drill through the cement device. This does not impede the drilling process that occurs subsequently to the use of the preheater device.

The present disclosure is therefore directed to a preheater device which is formed of a cement body of frangible material. This includes a bottom cylindrical receptacle. It terminates at the center in an upstanding stalk with lightweight chain pre-cast through the length of the body. The cement body is self-centralizing and supports an elongate cast cylindrical exothermic compound. One suitable material is molded thermite. A deflector plate made of the same cement is positioned on the top. It is sized relative to the casing to direct the flow of hot gases outwardly and against the wall of the casing to be heated. The device is held in place by a chain attached to one of the utility hoist cables common to all drilling rigs.

Applicant is aware of the following prior references developed in a pre-filing search:

DESCRIPTION OF THE PREFERRED EMBODIMENTS

Figure 1:
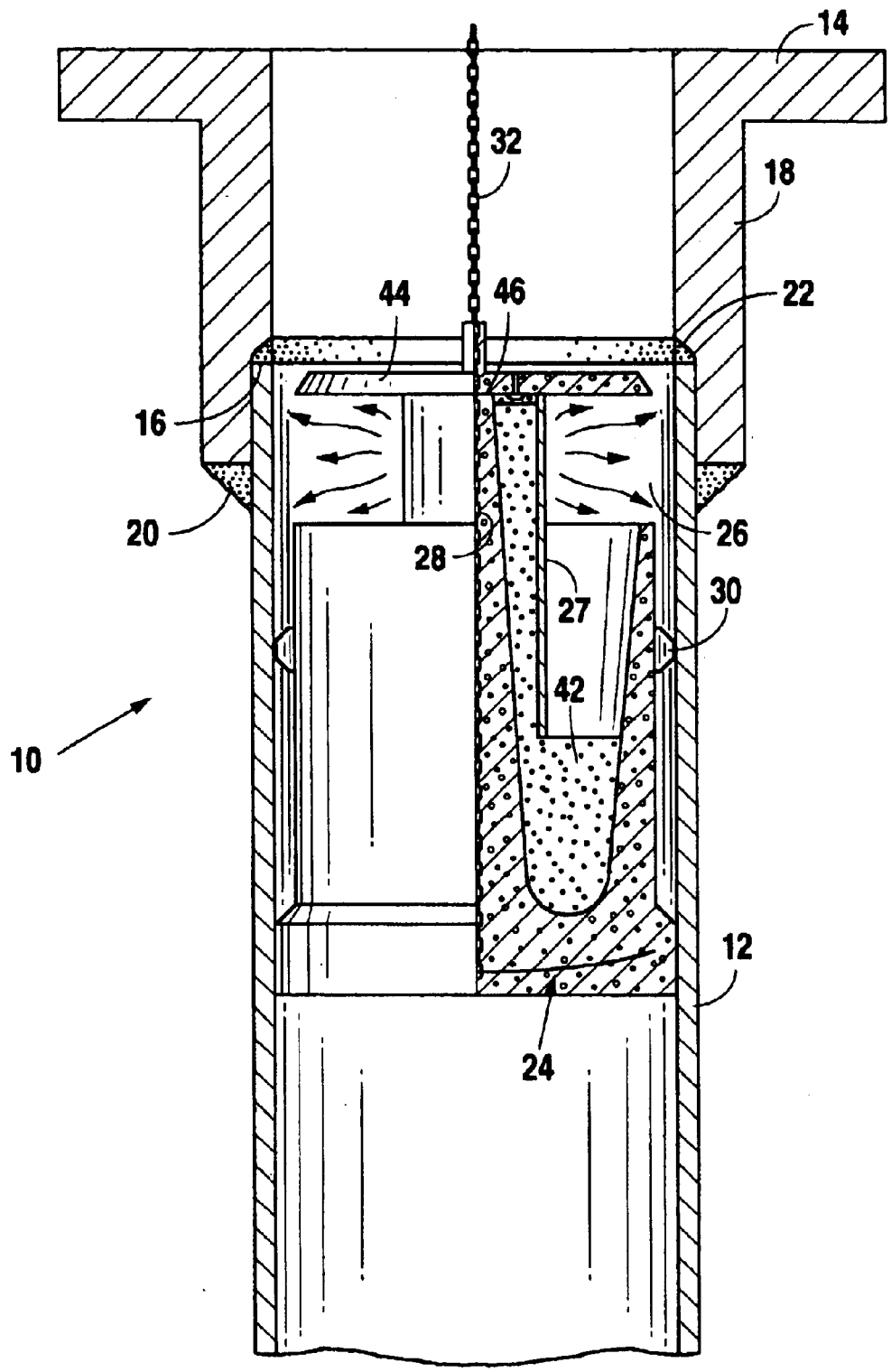
FIG. 1 is a partial sectional view through the pre-heater device of the present invention positioned in a casing to heat the casing and flanges for welding.

Attention is first directed to FIG. 1. It is shown in a pipe 12. Assume, for purposes of illustration, that the pipe 12 is a large casing having a wall thickness conforming with industry standards. The pipe 12 can range from ½ inch thick to about 1½ inches or greater. Moreover, a flange 14 is to be attached to the pipe 12. The flange 14 is constructed with an internal shoulder 16 to about the end of the pipe 12. It has a cylindrical portion 18 which telescopes over the pipe. A multi-pass bead is formed at 20, and an inside or finish bead is formed at 22. The bead 20 must be formed first to fully and completely anchor the flange to the pipe 12. The weld 20 is a high quality weld, subject to 100% inspection, and must be formed in many passes.

It is very important to preheat the pipe to a specified temperature. Failure to evenly preheat the pipe may damage the weld 20. It is for this purpose that the present preheater is installed in the pipe 12. Moreover, it is spaced so that the rising hot gases in the pipe are deflected against the pipe in the near vicinity of the weld 20 to preheat that area to the required temperature. Since it requires a substantial period of time to weld the flange in place, the preheater of this disclosure must burn for a significant interval. This is a scale factor which can be varied dependent on the size of the pipe, the temperature required in preheating, the number of passes required in the weld 20 and other factors such as these. Suffice it to say, the present disclosure provides a preheater which can be sized to preheat the pipe to the required temperature for the required interval. To this end, the device 10 is shown in the pipe 12, being located in the position that it maintains during use.

The preheater device 10 includes cement bottom support member 24. This is constructed in the form of a cylinder with centralizing projections. The member 24 is fabricated of heat resistant calcium aluminate cement with expanded vermiculite as grog, and should be capable of supporting the combustible element during its combustion, as for instance, at temperatures upwards of 5,000.degree. F. The support member 24 is of sufficient thickness to retain the white hot slag from the exothermic reaction. Ideally, it is quite frangible and can be easily fractured on drilling through it later in the process should it all fall into the wellbore. There is an air gap 26 at the top of the cylinder to direct hot gases at the casing wall 12.

A smaller diameter cellulose tube 27 fits over the neck 28 of the device and is filled with moulded thermite. This is to support the neck during shipment and to facilitate ignition by means of touch holes in the upper deflector plate. Ideally, the neck 28 is cast as a single piece with the bottom support member 24.

The preheater 10 is centralized within the pipe 12 by several integrally cast protrusions 30. A light weight chain 32 is cast into the device as a means of suspension in the wellbore. It will be recalled that the preheater is partly combusted and, therefore, loses weight during combustion. It is preferable that the chain 32 be sufficiently strong even when heated that it retains its strength to suspend the illustrated shape.

The numeral 44 identifies a top deflector plate. The deflector plate is supported on an inclined circumferential shoulder 46 formed on the neck 28 of the device 10. The angle of the shoulder 46 need not be extreme, and is typically in the range of 45 to 60 degrees. The deflector plate 44 is provided with a matching counter-sunk shoulder for cooperative engagement with the shoulder 46. The deflector 44 terminates at an outer edge which is sized to fit within the casing 12 with perhaps ¼ to ½ inch of clearance. During combustion, rising hot gases flow upwardly through the gap 26, and flow past the edge of the deflector 44. This deflects the hot gases towards the wall and thereby heats the pipe 12 in the most desirable manner. This particularly assists in directing the heat against the casing 12 in the near vicinity of the welded bead 20 on the exterior. The device is positioned so that the edge of the deflector is close to the bead 20 so that the hot gases are deflected against it.

The fuel 42 is a sacrificial, poured mixture made of non-toxic materials. One example is exothermic thermite which is defined, for purposes of this disclosure, as a granulated and cast mixture of aluminum particles with iron oxide. A bonding agent is added and suitable bonding agents include various and sundry binders such as starch. The fuel 42 is sacrificial in that it must be a combustible material which sustains a slow burn for the requisite interval. For instance, the fuel may be poured with suitable inhibitors and binding agents so that it burns at 5,000.degree. F. for sufficient time to heat the casing by convection and subsequently the wellhead by conduction. It will be appreciated that it shrinks during combustion. As it shrinks, it nevertheless gives off great clouds of heated gases which rise towards the deflector 44 and pass through the gap 26 adjacent to the preheater. This preheats the pipe to the required temperature for the required interval. Various and sundry inhibitors can be added to slow down the rate of burning.

Figure 3:
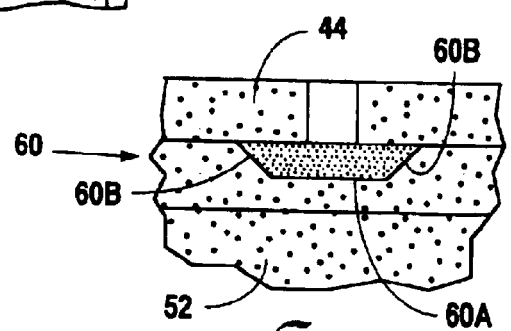
FIG. 3 is a cross-sectional view taken along line 3—3 of FIG. 2, illustrating the grooveway and the solid ignition material therein.
Figure 4:
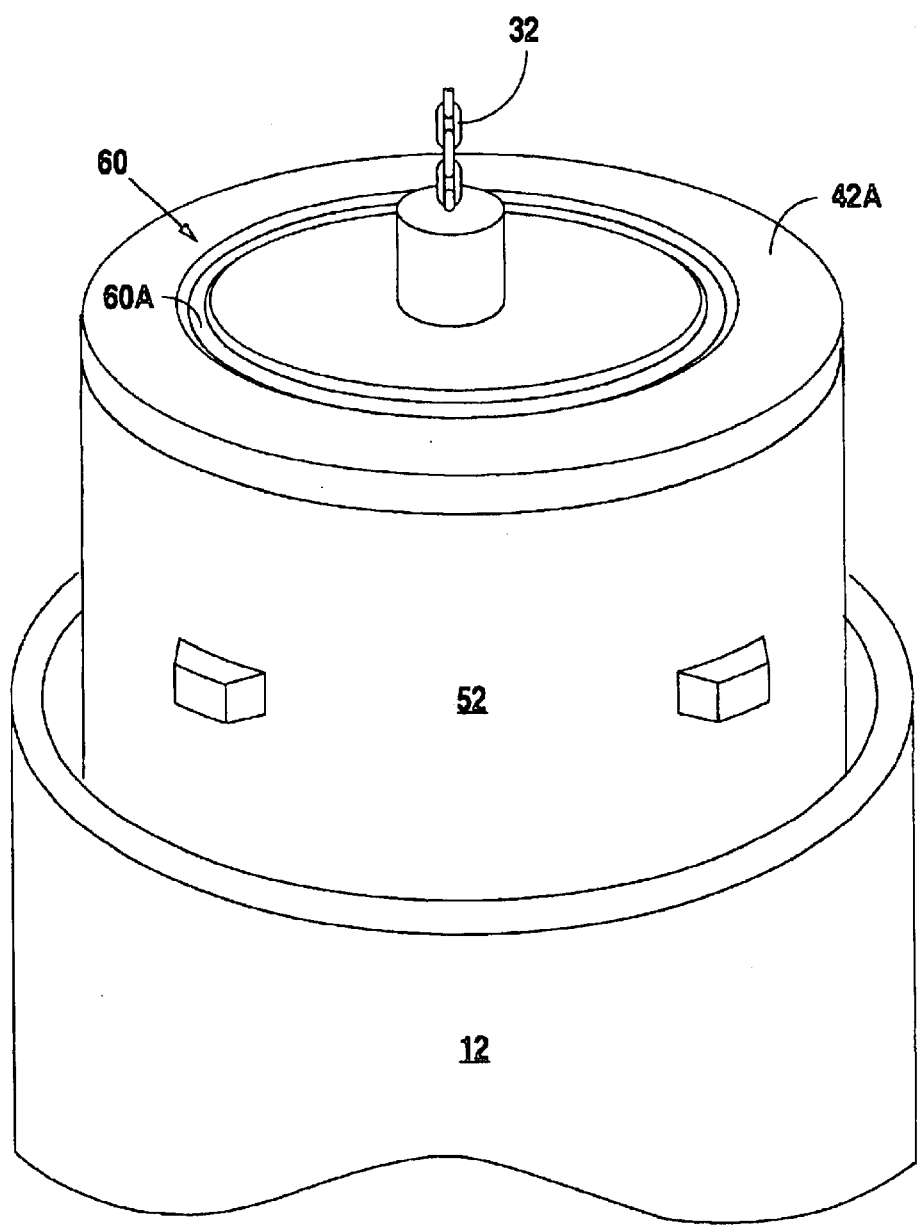
FIG. 4 is a cross-sectional view similar to that of FIG. 3, illustrating the configuration of the grooveway and the solid ignition fuel therein and taken along line 4—4 of FIG. 2.

Now referring to FIGS. 3 and 4, upon solidification of the fuel 42 in the pre-heater 10 housing, a grooveway 60 is profiled into a pre-selected depth around the uppermost or top surface 42A of the primary combustion fuel 42. Those skilled in the art will appreciate that the depth and particular configuration of the grooveway 60 is not particularly critical to the practice of the present invention and will depend on a number of variables, such as the selected primary fuel 42, the particular configuration of the pre-heater 10, the composition of the selected igniting fuel compound, and the like. Those skilled in the art will be able to properly provide for the desired configuration of the grooveway with very little, or no, experimentation or testing. For example, a grooveway of about three-eighths inch depth and 0.50 to 0.75 inches in circumference may be provided around and in the upper top surface of the solid fuel component 42. As shown in FIGS. 3 and 4, the grooveway 60 profiled in the top surface 42A and has a flat lower surface 60A from which extend first and second outwardly angled side walls 60B for containment of the secondary, or oxygen liberating compound 61. The compound 61 may be inserted into the grooveway 60A either as a solid in the form of the interior of the grooveway 60, or may be poured therein in the form of a liquid or paste for subsequent solidification there and thus taking the shape of the interior of the grooveway 60.

Various and sundry starters or initiator compounds may be used in the present invention within the grooveway 60. Those skilled in the art of pre-heaters for welding are quite knowledgeable about the selection and use of the starter compounds that may be placed within the grooveway 60. Combustion may be initiated by simply placing an acetylene torch to the initiator or primary combustion compound within the grooveway through touch holes 62 in the deflector plate 44, or otherwise directly applying a torch or other fire to the starter material and lowering the apparatus 10 on a chain or the like into the casing and combustion is permitted until the fuel is entirely consumed. Alternatively, it can be started in combustion by simply applying an acetylene torch on the top portions of the fuel in the touch-holes in the deflector plate. Once combustion has begun the device is lowered on an overhead suspension apparatus (not shown) into the casing and combustion is permitted to continue until the fuel is entirely consumed.

As an example of one fuel compound, a suitable starch, serving as a binder, is mixed with approximately equal parts by volume of aluminum and iron oxide. They are preferably ground relatively fine, having particles in the range of about 20 mesh or smaller. Other sizes can be used, it being kept in mind that larger particles burn slower and at a lower temperature.

The device of the present invention is particuarly easy to use. It is positioned in the casing 12 and suspended so that the deflecting plate 44 is exposed. A welder ignites fuel in the touch-holes with his torch and the preheater is then lowered into the casing until it is positioned as shown. Various and sundry temperature sensitive devices are used on the exterior to determine that the casing has been adequately preheated. When this occurs, the welder can then begin welding the flange in position by forming the multi-pass bead 20. On large casing, the bead 20 is formed by many passes. After the several passes are made, the bead can thereafter be inspected on permitting the casing to cool. It is also optionally necessary to form the bead 22 on the interior of the casing. This bead is formed typically after the pre-heater 10 has been removed from the casing. This bead is less critical in terms of preheating.

The present apparatus can be sized by varying the amount of exothermic compound placed into the cement casting. For a given combustible mixture such as thermite, the dimensions can be varied to control the duration of burning.

The integrally cast projections which extend from the bottom and upper third of the casing 12 radiate outwardly to position the preheater 10 in the casing. They do not have to be precise in length or location. Precise alignment of the bottom end of the equipment is less important than positioning concentrically in the casing of the deflector 44. As a general proposition, the spacing of the deflector plate should be relatively concentric with respect to the pipe 12. As will be understood, a chimney effect may occur which sweeps the heated gases upwardly against the casing. This carries excess heat out through the top and away from the welder so that his field of vision is not obscured.

Figure 2:
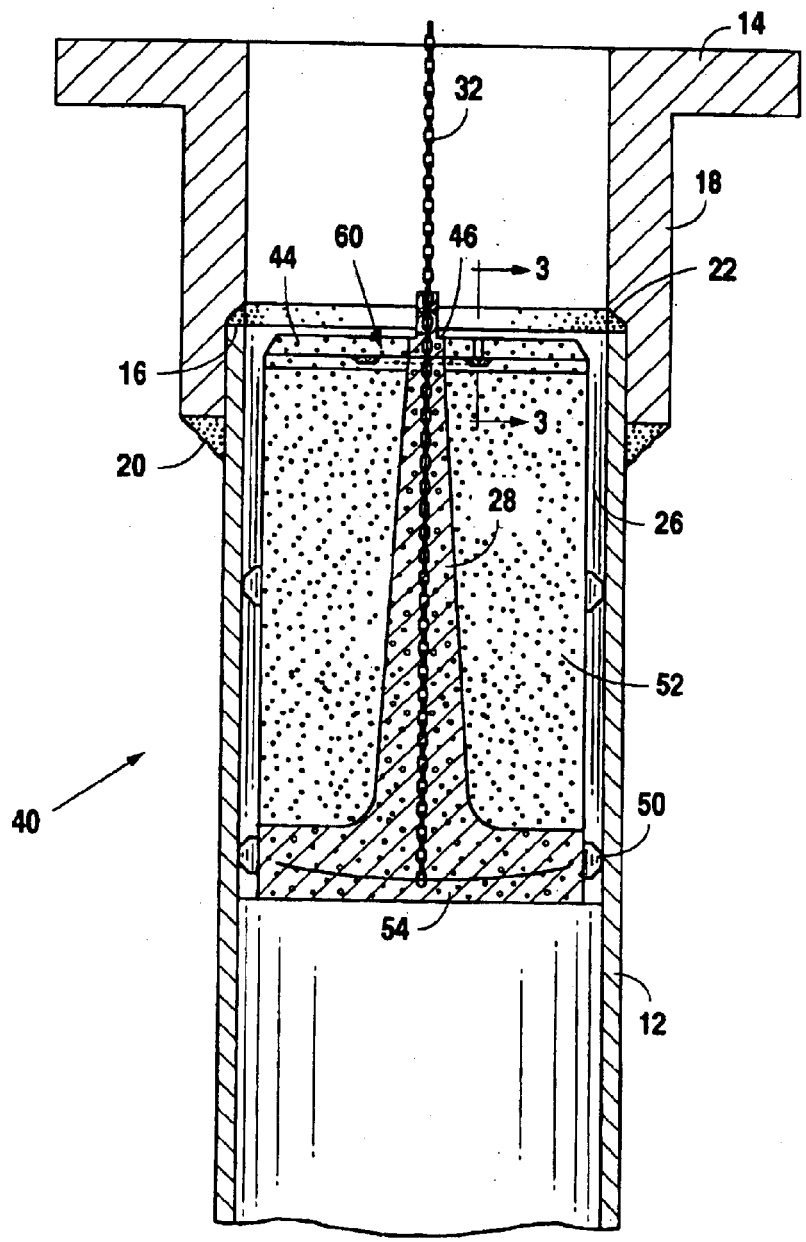
FIG. 2 is a sectional view of an alternative embodiment of the present invention.

Referring now to FIG. 2, an alternate embodiment of the invention is shown. It will be observed that the apparatus 40 differs from the apparatus of FIG. 1 in that it is not constructed in the form of a cylinder open at the top and closed at the bottom. The apparatus 40 includes a base member 54 extending radially outwardly from the lower end of the neck 28. Preferably, the neck 28 and the base member 54 are cast as a single piece. Integrally cast projections 50 are equally spaced about the periphery of the base member 54 for centralizing the apparatus 40 within the pipe 12.

The fuel mixture 52, in the alternate embodiment, is moulded thermite, a slow burning, non-toxic material previously described herein. The fuel mixture 52 is a cast cylindrical body having an axial opening extending therethrough for receiving the stem 28. It is supported at the lower end thereof by the base 54. The deflector plate 44 caps the fuel mixture 52 as shown in FIG. 2. The cylindrical body of the fuel mixture 52 is sized to fit within the pipe 12 with perhaps one half to one inch of clearance about the periphery thereof. During combustion, hot gases radiate outwardly from the cylindrical body of the fuel mixture 52 to thereby heat the wall of the pipe 12. The hot gases rise upwardly and flow past the edge of the deflector plate 44. The fuel mixture 52 is positioned so that it is opposite the bead 20, as shown in FIG. 2, so that hot gases are deflected against it. As the fuel mixture 52 burns, the white hot slag from the exothermic reaction falls to the bottom of the wellbore and it is drilled through later in the process.

Although the invention has been described in terms of specified embodiments which are set forth in detail, it should be understood that this is by illustration only that the invention is not necessarily limited thereto, since alternative embodiments and operating techniques will become apparent to those skilled in the art in view of the disclosure. Accordingly, modifications are contemplated which can be made without departing from the spirit of the described invention.

What is claimed and desired to be secured by Letters Patent is:

1. For use with a pipe to be welded, which pipe is in a surrounding concentric relationship and which requires preheating to an elevated temperature for a specified interval, a preheating apparatus comprising:

(a) a supporting cylindrical casting sized to fit within a pipe to be preheated, said cylindrical casting including a bottom portion and defining a cavity;

(b) a combustible solid fuel mixture supported in said casting and having a generally cylindrical elongate outer surface conforming to the cavity defined by said cylindrical casting, said mixture further being made of a material which burns at a controlled temperature for a specified interval to liberate heat in the form of upwardly flowing gases;

(c) a deflector plate having upper and lower face surfaces positioned above and spaced from said casting defining a gap there between, said deflector plate extending outwardly and arranged concentrically within the pipe to deflect the upward flow of heated gases radially toward the surrounding pipe;

(d) a grooveway imbedded within and disposed radially around an upper portion of said solid fuel mixture and facing the lower face side of said deflector plate;

(e) an oxygen liberating pre-starter compound housed within said grooveway for uniformly igniting said combustible solid fuel mixture thereunder;

(f) integrally cast chain means adapted to support and position said cylindrical casting in the pipe; and (g) wherein said cylindrical casting is formed of a frangible material.

2. The apparatus of claim 1 wherein said deflector plate is formed of the same frangible material.

3. The apparatus of claim 1 wherein said bottom portion and said deflector plate are separated by a solid upstanding neck extending from said bottom portion toward said deflector plate and said neck is formed of a frangible material integral with said bottom portion.

4. The apparatus of claim 3 wherein said deflector plate, said neck and said bottom portion are all formed of a frangible material of cast cement and said solid fuel mixture leaves a frangible ash.

5. The apparatus of claim 1 wherein said cylindrical casting includes integral projections on the exterior thereof to centralize said cylindrical casting.

6. The apparatus of claim 1 wherein said solid fuel mixture includes binder material for binding non-toxic flammable materials comprising the fuel mixture material into a single structure conforming to the shape defined by the cavity of said cylindrical casting.

7. The apparatus of claim 6 wherein the oxygen liberating compound comprises iron oxide.

8. The apparatus of claim 1 wherein the oxygen liberating compound comprises iron oxide.

9. The apparatus of claim 1 or 6 wherein said deflector plate includes a plurality of ports therethrough and communicating between said upper and lower faces for exposure to said oxygen liberating pre-starter for igniting said pre-starter.

10. For use with a pipe to be welded, which pipe is in a surrounding concentric relationship and which requires preheating to an elevated temperature for a specified interval, a preheating apparatus comprising:

(a) a supporting cylindrical casting sized to fit within a pipe to be preheated, said cylindrical casting including a bottom portion and defining a cavity;

(b) a combustible solid fuel mixture supported in said casting and having a generally cylindrical elongate outer surface conforming to the cavity defined by said cylindrical casting, said mixture further being made of a material which burns at a controlled temperature for a specified interval to liberate heat in the form of upwardly flowing gases;

(c) a deflector plate having upper and lower face surfaces positioned above and spaced from said casting defining a gap there between, said deflector plate extending outwardly and arranged concentrically within the pipe to deflect the upward flow of heated gases radially toward the surrounding pipe;

(d) means adapted to support and position said cylindrical casing in the pipe;

(e) a grooveway imbedded with and disposed radially around an upper portion of said solid fuel mixture and facing the lower face side of said deflector plate;

(f) an oxygen liberating pre-starter compound housed within said grooveway for uniformly igniting said combustible solid fuel mixture thereunder, (g) integrally cast chain means adapted to support and position said cylindrical casting in the pipe; and (h) wherein said cylindrical casting is formed of a frangible material.

11. For use with a pipe to be welded, which pipe is in a surrounding concentric relationship and which requires preheating to an elevated temperature for a specified interval, a preheating apparatus comprising:

(a) a supporting casting sized to fit within a pipe to be preheated, said casting including a bottom portion;

(b) a combustible solid fuel mixture supported on said bottom portion and having a generally cylindrical elongate shape, said mixture further being made of a material which burns at a controlled temperature for a specified interval to liberate heat in the form of radially flowing gases;

(c) a deflector plate having upper and lower face surfaces positioned above said bottom portion, said deflector plate extending outwardly and arranged concentrically within the pipe to deflect the upward flow of heated gases radially toward the surround pipe;

(d) a grooveway imbedded within and disposed radially around an upper portion of said solid fuel mixture and facing the lower face side of said deflector plate;

(e) integrally cast chain means adapted to support and position said supporting casting in the pipe; and (f) wherein said bottom portion and said deflector plate are separated by a solid upstanding neck integrally formed with said bottom portion and extending through said solid fuel mixture supported on said bottom portion.

12. The apparatus of claim 11 wherein the oxygen liberating compound comprises iron oxide.

13. The apparatus of claim 11 wherein said deflector plate includes a plurality of ports therethrough and communicating between said upper and lower faces for igniting the oxygen liberating pre-starter.

* * * * *